United States Patent [19]

Houston et al.

[11] 3,836,299

[45] Sept. 17, 1974

[54] PRESS FOR FORMING ONE-PIECE TABLET CONTAINING SEEDS OR THE LIKE

[75] Inventors: Robert K. Houston, Santa Clara; Donald W. Irving, San Jose, both of Calif.

[73] Assignee: FMC Corporation, San Jose, Calif.

[22] Filed: Aug. 13, 1973

[21] Appl. No.: 387,887

[52] U.S. Cl.............. 425/128, 425/136, 425/259, 198/201, 264/113, 221/211, 425/140
[51] Int. Cl............................ A01c 1/06, B30f 11/08
[58] Field of Search .......... 425/110, 116, 120, 126, 425/128, 135, 136, 145, 137, 140; 221/211; 198/201

[56] References Cited
UNITED STATES PATENTS

| | | | |
|---|---|---|---|
| 2,735,380 | 2/1956 | Bowes | 425/352 X |
| 2,795,199 | 6/1957 | White | 425/128 X |
| 3,000,331 | 9/1961 | Frank | 425/140 X |
| 3,096,248 | 7/1963 | Rudski | 425/128 X |
| 3,303,537 | 2/1967 | Mislan | 425/137 X |
| 3,371,136 | 2/1968 | Johannsen | 425/120 X |
| 3,555,730 | 1/1971 | Brink | 425/128 X |
| 3,661,489 | 5/1972 | Moore | 325/116 X |
| 3,775,034 | 11/1973 | Knapp | 425/128 |
| 3,525,7382 | 9/1970 | Devol | 425/137 X |

Primary Examiner—J. Howard Flint, Jr.
Attorney, Agent, or Firm—R. S. Kelly; C. E. Tripp

[57] ABSTRACT

An optical seed detector and seed remover for a tablet forming press capable of making, from frangible materials, tablets containing agricultural seeds. The optical seed detector monitors the deposit of a seed or seeds into each tablet by integrating the instantaneous projected dimensions of the seeds passing in front of a fiber optic sensor. If more or fewer seeds than the desired number are deposited, the tablet material and the seeds are eliminated from the press by a rejector before an imperfect tablet can be formed. In cases where only a single seed is desired in each tablet, the apparatus can thereby eliminate from the tablet press those tablets into which either no seed or two or more seeds were inadvertently deposited.

21 Claims, 18 Drawing Figures

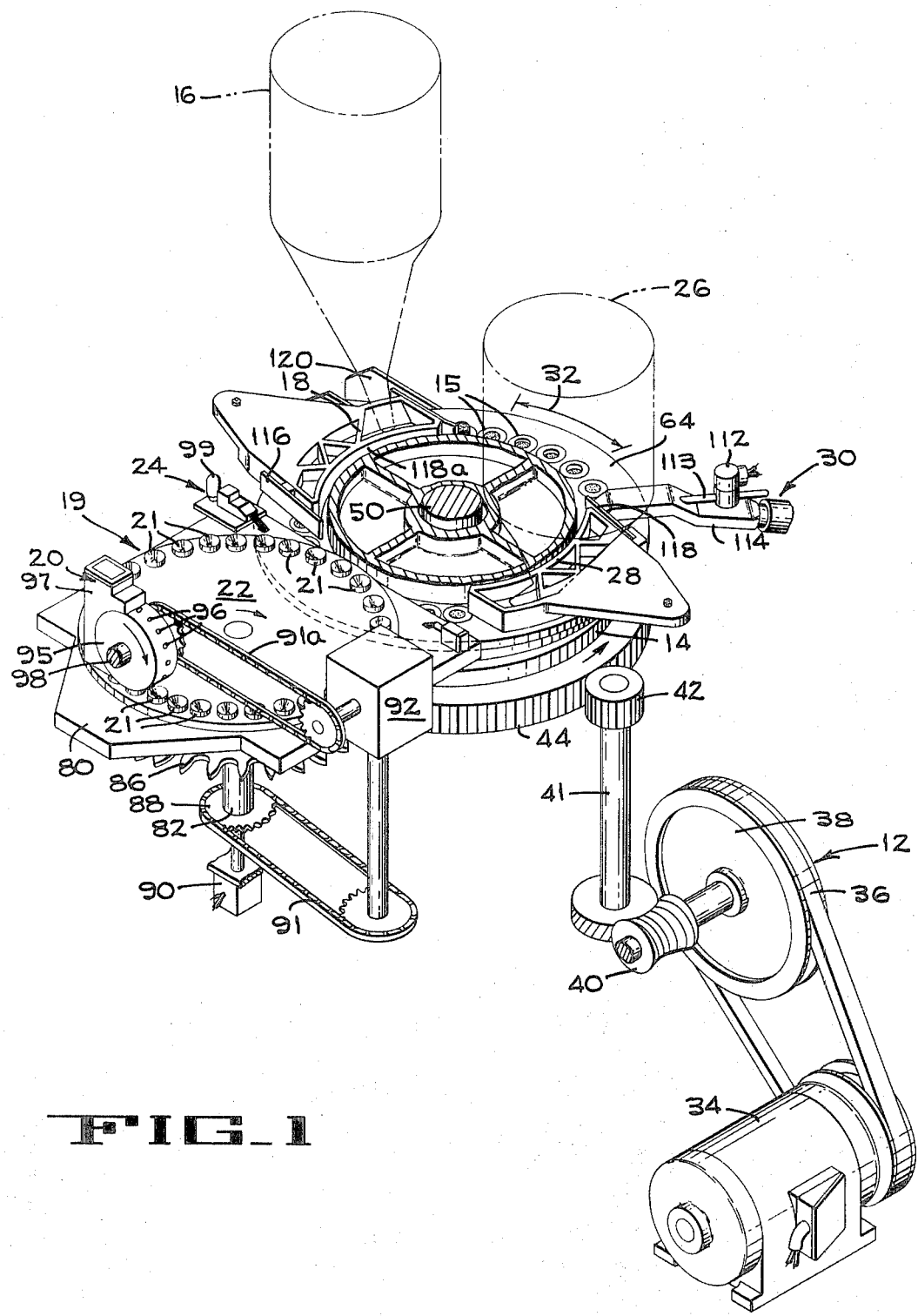
FIG_1

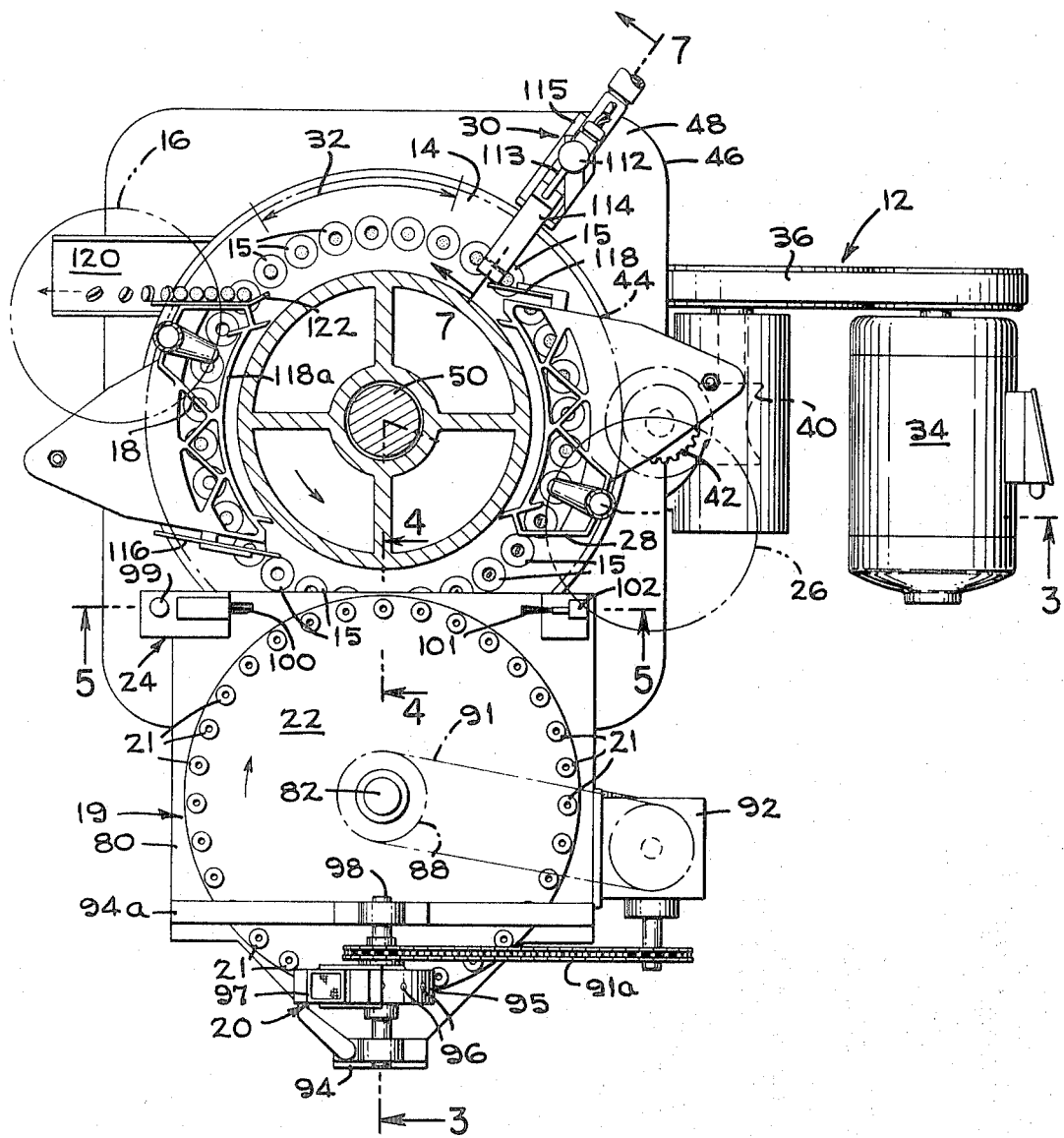
FIG_2

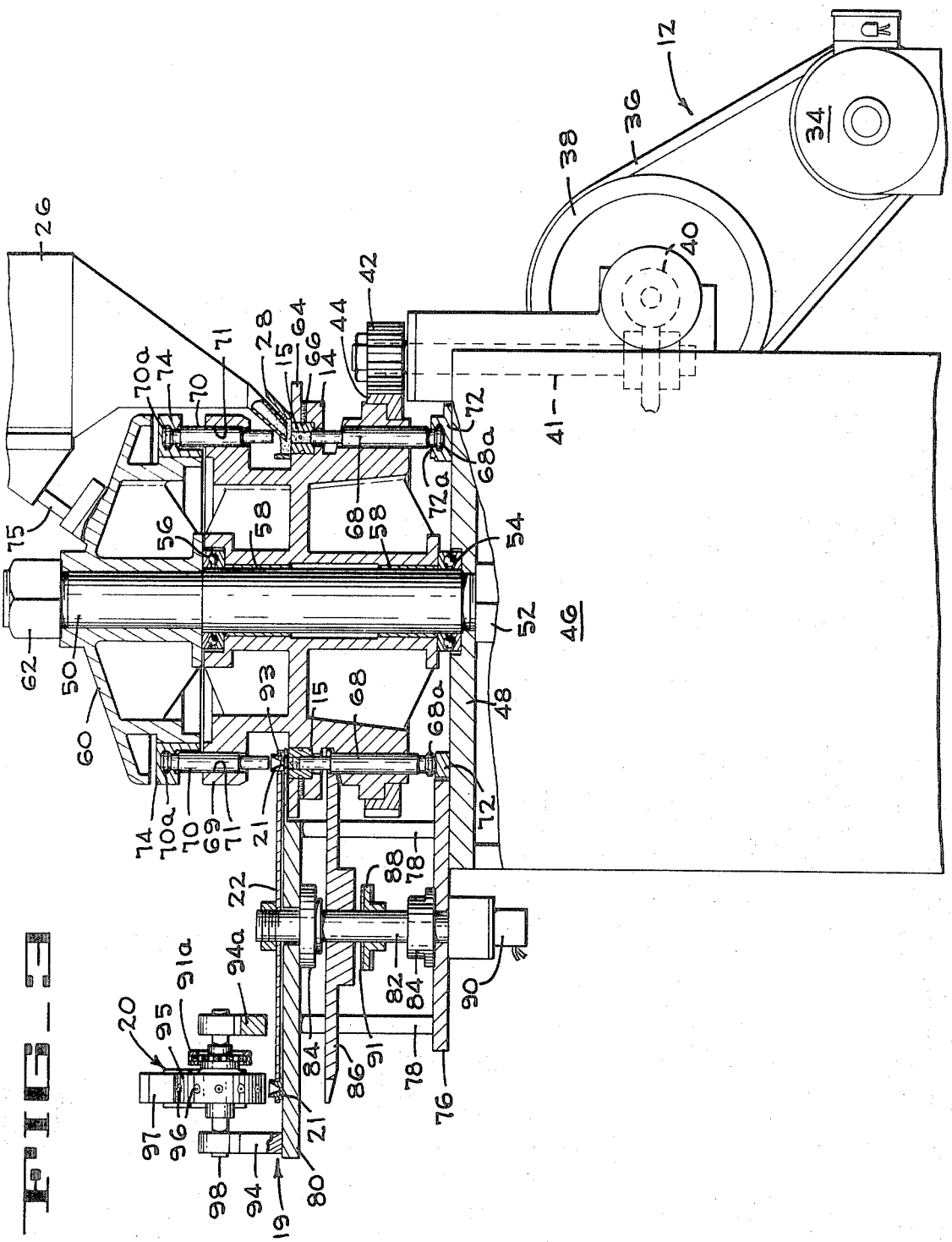

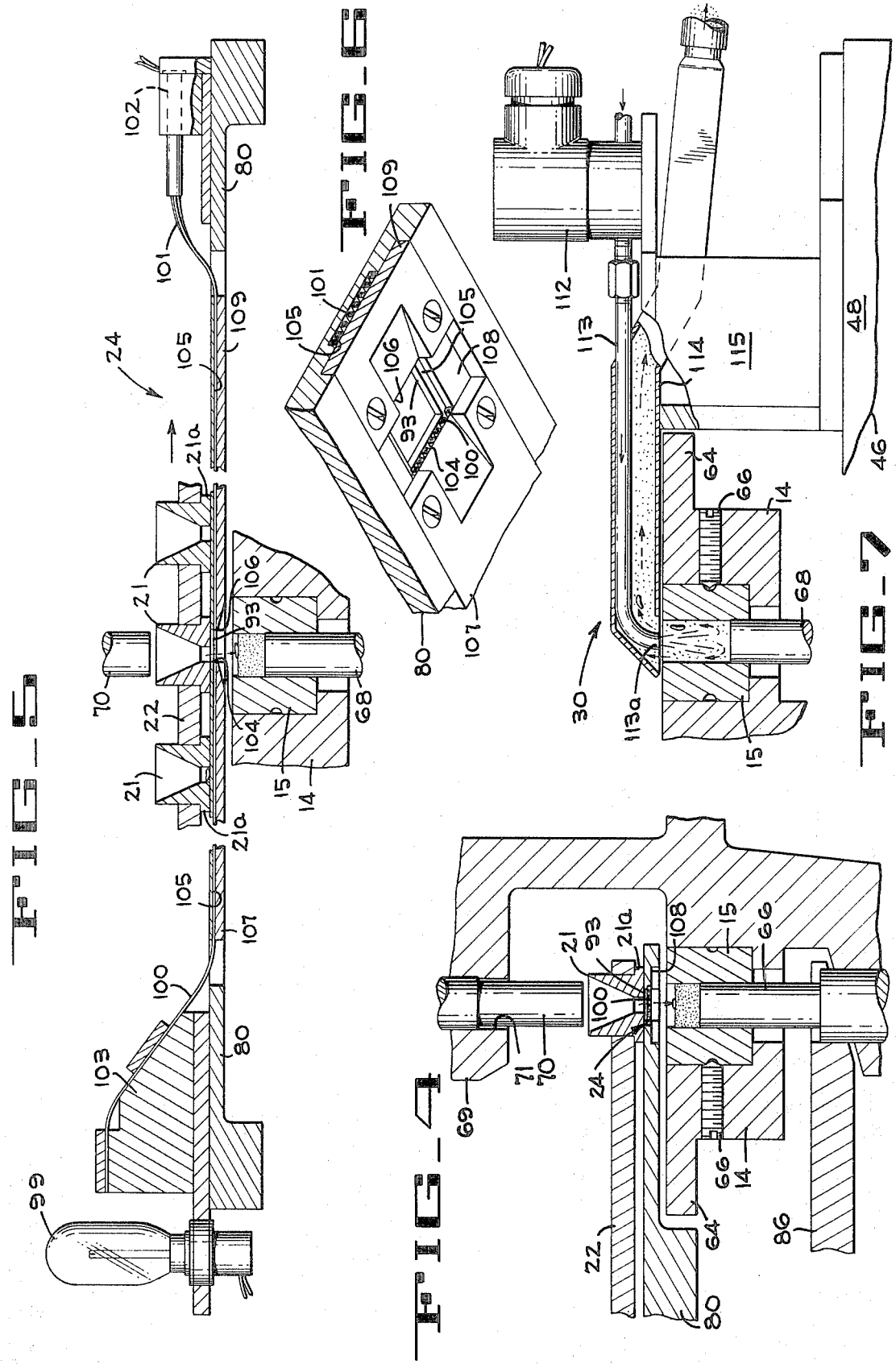

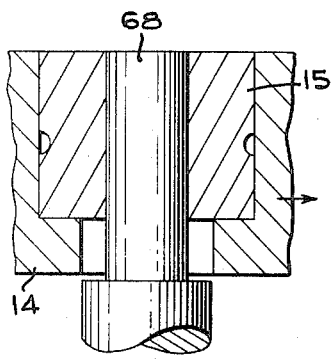
FIG_8
PREPARATION
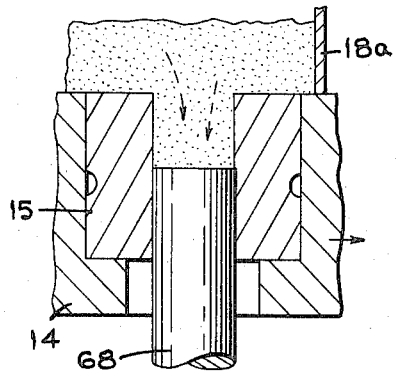
FIG_9
FIRST FILL
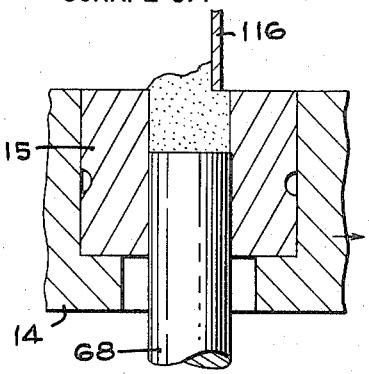
FIG_10
SCRAPE OFF
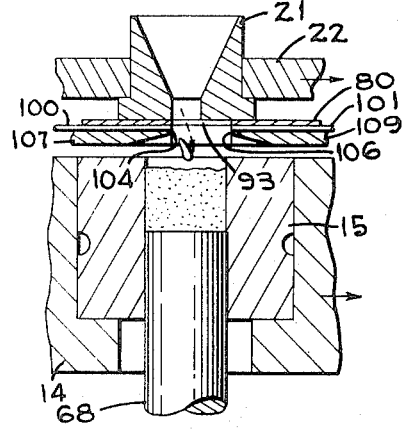
FIG_11
SEED DROP
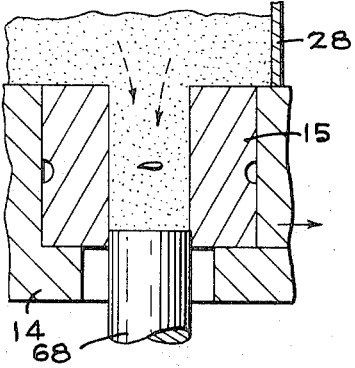
FIG_12
SECOND FILL
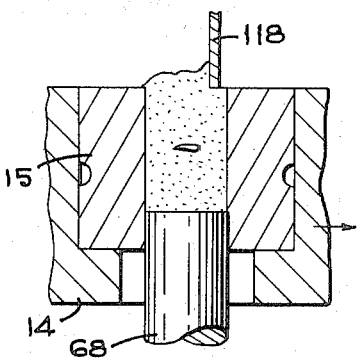
FIG_13
SCRAPE OFF
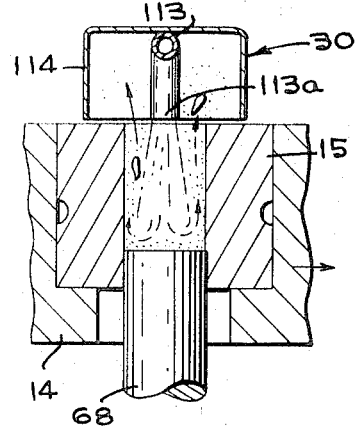
FIG_14
TABLET REJECTION
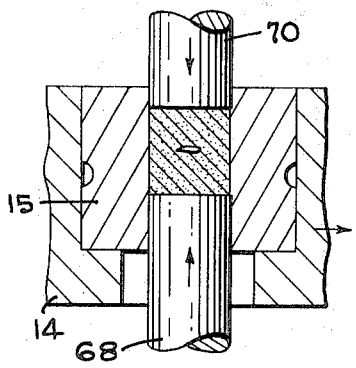
FIG_15
COMPRESSION
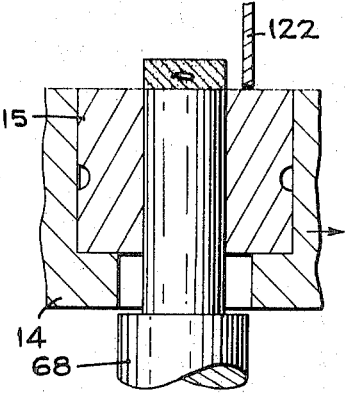
FIG_16
DISCHARGE

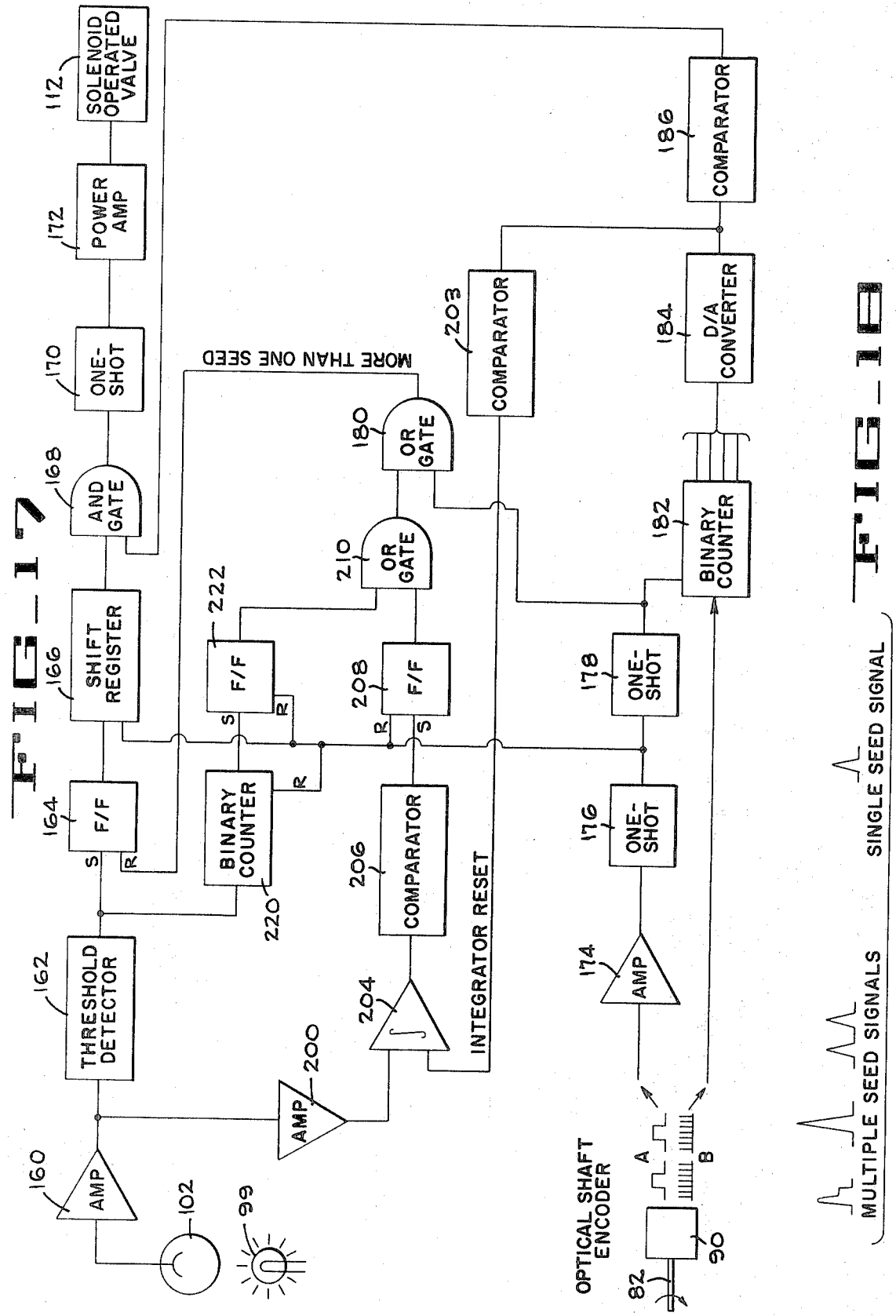

PRESS FOR FORMING ONE-PIECE TABLET CONTAINING SEEDS OR THE LIKE

BACKGROUND OF THE INVENTION

1. Field of the Invention

This invention relates to machines for making tablets and more particularly to machines for making tablets from frangible materials which tablets contain one or more agricultural seeds.

2. Description of Prior Art

In the past it was quite common for farmers to plant more seeds than were necessary in uniform rows and to thin out the unwanted plants later in the growing season since singulation of the small seeds proved to be difficult and since many of the seeds placed directly in the ground would fail to germinate. Although the cost of the seeds is usually quite nominal, this practice of thinning after the planting of an excess of seeds requires an extensive amount of labor. Usually, a man must walk down each row and thin out the row by hand. To eliminate this need to thin out the excess plants, seed producers turn to encapsulating seeds. By singulating the seeds and individually inserting each seed into a capsule or tablet, the seeds can be mechanically planted on an individual basis and at the desired position to insure germination, and the plants resulting therefrom do not require manual thinning.

It should be appreciated that it is essential for proper planting that each tablet contain precisely one seen or precisely the prescribed number of seeds. Unless each tablet contains a known quantity of seed, the farmer cannot mechanically plant his fields with any precision. The planting machines are designed to insert the seed tablet or capsules into the ground at uniformly spaced intervals. If the seed tablets contain varying quantities of seed, then the seeds are sown in varying distributions even though the tablets are evenly spaced. The result is that either the rows of plants must be thinned or the field is not planted for maximum crop yield.

To meet these objectives, various coverings have been proposed for seeds that both insure a high percentage of germination and make precision mechanical planting easier and more efficient. The U.S. Pat. to Vogelsang No. 2,502,809, Hodges No. 1,645,001, Clawson No. 2,785,969, Scott No. 2,967,376, Tukacs No. 3,077,700, Eversole No. 3,113,399, Legal et al. No. 3,316,676, Johnson et al. No. 3,648,409 and Adams 3,561,159 disclose various protective coverings for seed and the various mixes in which the seed may be embedded.

In addition, various apparatus and methods have been proposed to automatically encapsulate individual seeds with these materials. The U.S. Pat. to Knapp No. 3,640,428 discloses a one-piece tablet forming machine that photoelectrically monitors the deposit of the seeds into the tablets. Based on this monitoring, the machine subsequently discards those capsules not contained a seed. The U.S. Pat. to Brink No. 3,555,730 discloses an apparatus for compressing a first charge of frangible material, inserting a seed thereon, and compressing a second charge of frangible material on top of the seed and the first charge. The U.S. Pat. to Adam No. 3,561,159 and a further application of Brink, Ser. No. 244,484, filed April 17, 1972, describe machines for making two piece tablets from frangible materials. The U.S. Pats. to Tatsu Hori, Nos. 3,331,532 and 3,445,981 disclose the use of a photocell to scan a seed tape for multiple seeds.

In general, most of the seed tablet machines disclosed in the aforementioned patents are designed to singulate seeds from a supply of seeds and to encapsulate each seed individually. Some of these machines monitor for the proper insertion of single seeds and reject the tablets that do not contain a seed. However, none of these prior art machines are designed to monitor and detect tablets containing more than the required number of seeds. If two or more seeds are inadvertently inserted into a tablet, the prior art seed tablet making machines would treat the tablet in the same manner as a tablet containing just one seed. Usually multiple seed tablets are inadvertently produced by a malfunctioning seed singulator or a seed singulator lacking the requisite precision to precisely separate seeds individually. In any case, multiple seed tablets are as troublesome for the farmer as tablets containing no seeds.

In addition, there are situations in which the farmer desires a precise number of multiple seeds in each tablet. For example, tomatoes do not require thinning if they are planted in clumps of two or three plants at regularly spaced intervals. None of the prior art machines is adapted to produce multiple seed tablets containing a precise, predetermined number of seeds and to automatically reject all tablets not containing the predetermined number of seeds.

SUMMARY OF THE PRESENT INVENTION

The tablet forming machine of the present invention is an apparatus for encapsulating agricultural seeds in frangible materials, comprising: a tablet forming press including means for depositing frangible materials into a die and means for compressing said materials together in the die to form the tablets; means for depositing seeds within the materials in the die of the press whereby said compressing means forms tablets containing seeds located generally centrally therewithin; means for counting the seeds deposited in the die at one time and for generating an electrical signal indicating the number of seeds deposited therein; and means for rejecting any tablet lacking the predetermined number of seeds as indicated by the electrical signal from the counting means.

An important feature of the present invention is the apparatus for determining the number of agricultural seeds falling together into the material which will make up a single tablet. This apparatus includes means for generating a beam of light through which the seeds travel during free fall, said beam being wide (in the horizontal plane) and narrow (in the vertical plane) with respect to the dimensions of the seeds traveling therethrough whereby the seeds obscure a portion of the beam according to the projected corss-sectional dimension of each seed. The apparatus further includes a photocell for receiving the beam of light and for measuring the amount of illumination received whereby the instantaneous cross-sectional dimension of each seed can be calculated. A continuous measurement of the portion of the beam that is obscured is provided by said photocell, and means are provided for integrating the output of the photocell to generate a signal indicating the number of seeds falling together into a single tablet.

The main object of the present invention is to insure that each tablet formed by the tablet machine consistently contains precisely one seed or some greater, but predetermined, number of seeds. The optical detector monitors the deposit of seeds in the frangible materials and commands a rejection of the tablet if no seed or if an improper number of seeds is deposited. If required, the machine can be adjusted to form single seed tablets of precisely numbered, multiple seed tablets. For example, the machine can form tablets containing exactly two seeds and reject all materials having three seeds, one seed, or no seed.

An additional object of the present invention is to provide means for automatically eliminating the materials from the tablet forming dies before the tablets are formed where an improper number of seeds is present so that the machine never forms a seedless tablet or a tablet containing more than the required number of seeds. The operation of this rejector means before the improper tablet is formed prevents any later confusion and separation problems between properly made tablets and improperly made tablets.

BRIEF DESCRIPTION OF THE DRAWINGS

FIG. 1 is a diagrammatic perspective of the tablet making machine according to the present invention with a portion of the machine being shown in horizontal section above the dies where the tablets are formed and with certain parts of the machine being shown in phantom;

FIG. 2 is a plan view of the tablet making machine shown in FIG. 1 with a portion thereof being broken away and shown in horizontal section;

FIG. 3 is a vertical section taken along line 3—3 of FIG. 2 illustrating the interrelationship of the moving parts of the tablet machine;

FIG. 4 is an enlarged vertical section taken along line 4—4 of FIG. 2 illustrating a seed being dropped into a mold cavity monitored by the light conduits of the optical seed detector;

FIG. 5 is an enlarged vertical section taken along line 5—5 of FIG. 2 illustrating the optical seed detector of the present invention;

FIG. 6 is a diagrammatic perspective of a portion of the fiber optic seed detector looking upward toward the seed feeding means from the lower housing of the tablet making machine of the present invention;

FIG. 7 is an enlarged vertical section taken along line 7—7 of FIG. 2 illustrating the rejector of the present invention.

FIG. 8–16, inclusive, are progressive operational views in enlarged vertical section through a mold cavity illustrating the formation of a seed containing tablet according to the present invention;

FIG. 17 is a diagrammatic electrical control and logic circuit for the tablet making machine of the present invention; and FIG. 18 is a diagrammatic illustration of the voltage signals obtained by the electrical control and logic circuitry of FIG. 17.

DESCRIPTION OF THE PREFERRED EMBODIMENT

SUMMARY OF THE PHYSICAL CONSTRUCTION OF THE ENTIRE MACHINE

In general, the tablet machine of the present invention forms tablets by placing a first measured charge of frangible material into a mold cavity, dropping a seed (or seeds) in the mold cavity on top of the first charge, placing a second measured charge of frangible material in the mold cavity on top of the seed and the first charge, and then compressing the two charges of frangible material around the seed to form a one-piece tablet.

More specifically, in FIG. 1 reference numeral 12 generally indicates a main drive train for powering the entire tablet machine. The main drive train rotates a central die table 14 that transports the circumferentially spaced mold cavities. Each mold cavity is formed within a circular die 15 that is embedded in the horizontal annular lip portion of the die table 14. Reference numeral 16 indicates a first powder horn for storing part of the supply of frangible material. The first power horn distributes frangible material into a first feeding baffle 18 that, in turn, deposits the first change of frangible material into each of the mold cavities.

Reference numeral 19 generally indicates a seed feeding apparatus including a seed singulator 20 for separating individual seeds from a mass of seeds and for individually depositing each seed into a seed cup 21 on a seed transfer plate 22. The plane of the seed transfer plate is parallel with the annular lip portion of the die table 14, and the transfer plate 22 overlies a portion of the lip of the die table. The transfer plate rotates in synchronization with the movement of the die table 14 so that as each seed cup 21 passes over a mold cavity the seed contained within the cup drops through a slot (not shown in FIG. 1) onto the first charge of material held in the passing mold cavity. As the seed drops, the projected area of the seed is measured by an optical seed detector 24 and this information is stored for later use.

Reference numeral 26 indicates a second powder horn on the tablet machine for storing a second supply of frangible material. The second powder horn distributes frangible material into a second feeding baffle 28 on the machine that, in turn, deposits the second charge of frangible material in the mold cavities on top of the first charge and the seed. Reference numeral 30 indicates a pneumatic rejector that is triggered on the basis of the projected seed area information, obtained by the optical seed detector 24. If either (1) a seed did not fall onto the frangible material, or (2) more than the required number of seeds fell, then, with a blast of air, the rejector blows the mold cavity empty and removes the materials therein from the machine. Thus, the frangible materials and seeds are completely removed from the machine and imperfect tablets are never formed. If, for example, each tablet is required to have only one seed and only one seed fell, then the rejector does not operate to empty the mold cavity. Reference numeral 32 generally indicates a tablet forming area on the tablet machine where the first and second charges are compressed together around the seed to form a complete seed tablet. The fully formed seed tablet is thereafter removed from the machine.

THE TABLET FORMING PRESS AND MECHANICAL DRIVE

The tablet forming press for the tablet machine includes the main drive train 12 for the tablet machine, the die tablet 14, the plurality of dies 15, and the components for feeding the frangible material into the mold cavities within the dies. The aforedescribed basic components of the tablet forming machine are conventional and have been adapted from a Colton Rotary Tablet Press, Model 260, manufactured by the Colton-Kiefer Division of the Cherry-Burrell Corporation of Parkridge, Ill. Referring to FIGS. 1, 2 and 3, the main drive train 12 includes an electric motor 34 that supplies power for the entire machine. The electric motor is connected so as to continuously drive a pinion gear 42 by means of a flexible belt 36 that drives a pulley 38 attached to a worm gear 40. The worm gear drives a vertically oriented shaft 41 to which the pinion gear 42 is attached at the upper end thereof. The pinion gear turns a large ring gear 44 that is rigidly bolted to the die tablet 14. The electric motor is thereby arranged to continuously rotate the die table and move the individual mold cavities inside the dies 15 in a circular path.

The tablet press includes a stationary lower housing 46 (FIG. 3) the top horizontal surface of which is comprised of a base table 48. Mounted in the center of the stationary base table is a die head spindle 50 that provides an axle for the rotating die table 14. the die head spindle is also stationary and is rigidly mounted to the base table 48 by a nut 52. The die table 14 is supported for rotation on the spindle by a lower ball thrust bearing 54, an upper ball thrust bearing 56, and two journal bearings 58. Mounted on the die head spindle 50 above the rotating die table 14 is a stationary upper housing 60 that is secured by a nut 62 to the upper end of the spindle. From FIG. 3 it can be seen that the lower housing 46 and the upper housing 60 do not move at all and that the die table 14 can be rotated with respect to the housings about the die head spindle 50.

Referring to FIG. 3, an annular lip 64 having an upper horizontal flat surface is provided at the periphery of the die table 14. This lip contains a plurality of vertical circular bores that are uniformly spaced apart about the periphery of the table. Each bore is counter bored to receive a cylindrical die 15 that forms the mold cavity in which the tablets are formed. The diameter of the tablets to be formed by the machine can be varied by using set screws 66 to remove the dies and replace them with dies having different sized bores. The floor of each mold cavity is formed by the upper end of a lower punch 68 that is received in the bore in the die 15. Directly above and coaxial with each lower punch is an upper punch 70. The upper punches are received in a plurality of vertical circular bores 71 in an upper annular lip 69 of the die table. There is an upper punch 70 and a lower punch 68 associated with each mold cavity and the tip of each punch is snugly received within the bore of each die.

Each lower punch 68 is provided with a cam portion 68a which is retained within a lower cam track 72 that is rigidly secured to the base table 48. Each upper punch is similarly provided with a cam portion 70a which is retained within an upper cam track 74 that is rigidly secured to the upper housing 60. As seen in FIG. 3, the right-hand side of the track 72 includes guide portions 72a enclosing the cam portions 68a while the left-hand side of track 72 no such guide portions; thus, the right-hand side of the track is used to lower the punches 68 by pulling them downwardly relative to the die table 14 while the left-hand side serves to elevate the punches. The punches are not spring loaded and are freely received within the bores in the die table. Thus, as the die table rotates, both the lower and upper sets of punches are rotated together horizontally about the spindle 50 and their vertical reciprocating motion is entirely controlled by the cam tracks. As will be explained in greater detail hereinafter, this relative vertical reciprocating motion is utilized to compress the tablet materials in the tablet forming process.

The supply of frangible material for the machine is stored in the two powder horns 16, 26 which are rigidly attached by brackets 75 (one only being shown in FIG. 3) to the stationary upper housing 60. The frangible material feeds by gravity through an open nozzle at the bottom of each powder horn. The nozzle of the first horn 16 is directed into the first feeding baffle 18, and the nozzle of the second horn 26 (FIG. 3) is directed into the second feeding baffle 28. The two feeding baffles are rigidly mounted by brackets (not shown) to the stationary base table 48. The feeding baffles hold the frangible material in place while the die table 14 rotates therebeneath sequentially exposing the mold cavities for filling. The mold cavities are filled from the feeding baffles by gravity, and the quantity of frangible material inserted in each cavity is controlled by the available volume in the cavity as determined by the position of the top of the associated punch 68.

THE SEED FEEDING APPARATUS

The seed feeding apparatus 19 includes a seed singulator 20 (FIG. 1) that separates individual seed from a mass of seeds and deposits each separated seed into a seed cup 21 on the seed transfer plate 22. The seed transfer plate turns in synchronization with the die table 14 so that each seed cup will be brought into vertical alignment with a mold cavity in the die table. As each seed cup passes over a mold cavity in the die table, the seed contained in the seed cup drops into the mold cavity.

As shown, in FIG. 3, a base plate 76 is rigidly mounted on the base table 48 of the tablet machine. The base plate 76 supports a pair of vertical legs 78 that are arranged to support an upper stationary support plate 80. The base plate 76, the support plate 80 and the legs 78 all form a stationary supporting structure for the rest of the components of the seed feeding apparatus 19.

A seed transfer shaft 82 (FIG. 3) is vertically mounted on a pair of bearings 84 located between the base plate 76 and the stationary support plate 80. The seed transfer shaft is arranged to be driven by a sprocket drive wheel 86 that is attached thereto. The teeth of the sprocket drive wheel 86 engage the exposed medial portions of the lower punches 68 of the tablet machine. The lower punches themselves are rotated by the die table 14 about the axis of the spindle 50; thus, the movement of the lower punches mechanically turns the sprocket drive wheel 86 and the seed transfer shaft 82.

The seed transfer shaft 82 is keyed to rotate the seed transfer plate 22 together with a sprocket timing gear 88 and an optical shaft encoder 90. The sprocket timing gear 88 (FIG. 1), which is keyed to the seed transfer shaft, drives the seed singulator 20 through a pair of endless chains 91, 91a and a right angle gear box 92. The movement of the seed singulator is synchronized with the movement of the seed transfer plate 22 to insure that as each seed cup 21 passes under the singulator, the singulator will deposit a seed therein.

The optical shaft encoder 90 (FIG. 3), which is also keyed to the seed transfer shaft, translates the angular rotation of the seed transfer shaft into an electrical output of signal pulses for the Electrical Seed Detector and Logic Circuit hereinafter described. The optical shaft encoder is of conventional design and generates a series of timing pulses which represent angular increments of shaft rotation.

The seed transfer plate 22 (FIG. 3), which is also keyed to the transfer shaft 82, slides the bottom surfaces of the seed cups 21 on the stationary support plate 80 between the seed singulator and the mold cavities in the dies 15. The seed transfer plate is a flat circular disc having a circular array of bores through its planar surface. Rigidly secured within each bore on the transfer plate is a seed cup 21. The angular distribution of the seed cups in the transfer plate is exactly the same as that of the array of dies 15 in the die table 14. Both the transfer cup plate and the die table rotate in synchronization so that each seed cup can simultaneously pass over a mold cavity.

Referring to FIG. 4, each seed cup 21 is seen to be generally cylindrical in shape having an interior cross-section shaped like an upwardly opening funnel. Each seed cup is open at both its top and its bottom ends so that a seed can pass freely therethrough. An annular flange 21a on each seed cup supports the periphery of the transfer plate 22 and rides on the surface of the stationary support plate 80. As the transfer plate rotates about the seed transfer shaft 82, it pushes the seed cups along in a horizontal plane, and the seed cups slide on top of the stationary support plate 80. The stationary support plate thereby normally forms a floor to prevent the seeds from falling through the bottom opening of the seed cups and allows the seeds to be moved from the singulator 20 to the dies 15. The stationary support plate also contains a seed slot 93, (FIGS. 4 and 5) in the path of the seed cups. The seed slot is located at the precise point on the stationary support plate where the seed cups pass over the mold cavities in the dies 15. The seeds are pushed by the walls of the seed cups from the seed singulator 20 to the seed slot where the seeds fall through the slot onto the first charge frangible material in the mold cavity. FIG. 4 illustrates a seed that has just dropped through the seed slot into a mold cavity.

The seed singulator 20, shown in FIGS. 1–3, in the embodiment of the invention to be described hereinafter, is arranged to separate individual seeds from a supply of seeds and drops the seeds individually into the seed cups 21. In general, any apparatus that can deposit single seeds into the seed cups can be used. The singulator disclosed in the present embodiment of the invention is the seed singulator disclosed in the copending United States patent application of Mr. Ralo L. Hembree, Ser. No. 245,076 filed Apr. 18, 1972 and assigned to the assignee of the present invention, and reference to the aforesaid application may be had for the details of the structure and operation of the singulator.

The seed singulator 20 is rigidly supported by two support brackets 94 and 94a, FIG. 2, attached to the stationary support plate 80. In general, the seed singulator is comprised of a hollow, rotatable drum 95 having a smooth peripheral surface and a plurality of conical cavities 96 arranged in a circle thereon. The cavities are all connected by restricted passageways (not shown) to the interior of the drum. When the interior of the drum is placed under a vacuum, a suction force is exerted through the conical cavities upon seeds located in an overlying hopper 97 (FIG. 1). The hopper surrounds a portion of the exterior of the drum and stores the supply of seeds. Inside the hopper are air jets (not shown) that blow off duplicate seeds picked up by the conical cavities so that only one seed is held by each conical cavity as it emerges from the hopper. The seeds are transported on the exterior peripheral surface of the drum and are retained in place by the vacuum. The drum 95 rotates on an axle 98 supported by the two support brackets 94 and 94a which axle is driven in synchronization with the movement of seed transfer plate 22 by means of drive chain 91a which is operatively connected to the right angle box 92 (FIG. 2). The movement of the seed singulator is thereby synchronized to the motion of the seed transfer plate so that as each individual seed cup 21 passes under the singulator, a conical cavity 96 containing a seed will pass over the seed cup. At this precise point of vertical alignment between seed cup and conical cavity, each conical cavity is arranged to be connected within the drum to a source of air pressure (by means not shown), and the seed is blown from the conical cavity down into the underlying seed cup.

Referring to FIGS. 4 and 5, it can be seen that one of the advantages of the seed feeding apparatus 19 is the short seed fall. During transfer each seed slides in a seed cup 21 horizontally along the top of the stationary support plate 80. The stationary support plate forms a floor for the seed cup and the walls of the seed cup push the seed along. When each seed cup passes over the slot 93 in the stationary support plate, the seed falls through the slot and into an underlying mold cavity. The dropping distance between the top of the stationary support plate and the top of the frangible material in the mold cavity is very short. This short dropping distance allows better azimuthal phase angle synchronization between the seed feeding apparatus 19 and the tablet forming press. Even at high processing speeds the seed is thereby able to be placed with ease in the center of the frangible material.

THE OPTICAL SEED DETECTOR

The optical seed detector 24 continuously measures the projected areas of the seeds that fall through the slot 93 in the stationary support plate 80. The data obtained by the optical seed detector is processed by the Electrical Seed Detector and Logic Circuit hereinafter described and is used to determine the number of seeds actually placed on the first charges of frangible material.

Referring particularly to FIGS. 5, the optical seed detector 24 will be seen to include a light source 99, a first array of fiber optic light guides 100, a second array of fiber optic light guides 101 and a photocell 102. The light source 99 is a conventional, focused filament lamp commonly used in motion picture projector sound systems. The light source is positioned to illuminate the end of the first array of light guides 100. The light guide fibers 100 and 101 are arranged in side-by-side, parallel relationship to form two flat, substantially horizontal, belts. The first array of light guides 100 extends from the focal point of the light source 99, over a supporting bracket 103, and into a rectangular channel 105 (FIG. 6) cut into the bottom surface of the stationary support plate 80. The rectangular channel 105 opens downwardly and forms a trough permitting both arrays of light guides to pass beneath the seed cups 21 and the seed transfer plate 22. The first array of light guides 100 is held up in the channel by a flat retaining guides 107 which is rigidly attached (FIG. 6) to the stationary support plate 80. The plate 107 is received in a wide channel 108 (FIG. 6) on the underside of the stationary support plate which channel is superimposed on the rectangular channel 105 housing the light guides. The first array of light guides 100 terminates at the edge 104 (FIG. 6) of the seed slot 93 in the stationary support plate. The second array of light guides 101 commences at the corresponding opposite edge 106 (FIG. 5) of the seed slot and extends through the rectangular channel 105 cut in the bottom surface of the stationary support plate 80. The second array of light guides 101 is held up in the rectangular channel 105 by a retaining plate 109 which is attached to the underside of the stationary support plate 80. The retaining plate 109 is also received in the channel 108 in the stationary support plate. The second array of light guides 101 terminates at the photocell 102. The photocell is a conventional, silicon solar cell producing an output voltage proportional to the incident light thereon. The output of the photocell is connected to the Electrical Seed Detector Circuit hereinafter described.

It should be appreciated that the peripheral area around the seed slot 93 has been designed to minimize any obstruction to the free fall of the seeds. In FIG. 6 it can be seen that both of the retaining plates 107 and 109 have been upwardly and inwardly relieved and terminate at the edges 104 and 106, respectively, of the seed slot.

As shown in FIG. 4, the optical seed detector 24 provides a rectangular beam of transmitted light which is relatively wide in the horizontal plane and relatively narrow in the vertical plane. The rectangular beam is located below the discharge point of the seeds from the second cups. As a seed drops from the seed cup into the pile of frangible material, the beam of light transmitted across the seed slot 93 will be interrupted. This interruption produces a decrease in the voltage output from the received photocell 102 that is proportional to the projected area of the seed cutting the beam of light. The amount of light obscured by the seed is directly proportional to the drop in the voltage output from the photocell. Thus, if two or more seeds fall together through the beam of light, the voltage drop generated by the photocell will be greater than that generated when only a single seed falls.

THE REJECTOR

The rejector 30 empties a mold cavity when no seeds or an improper member of seeds is placed therein so that a tablet cannot be improperly formed. If the optical seed detector 24 does not measure the placement of a seed in a mold cavity or measure the placement of two or more seeds where only one is desired, then the electrical control circuit commands the rejector to empty the specified mold cavity and to remove all of the contents therein before an improper tablet can be formed. If the optical seed detector measures the proper placement of exactly one seed, then the rejector does not operate and the contents of the mold cavity are subsequently compressed into a tablet in the tablet forming area 32 of the tablet machine.

Referring now to FIG. 7, reference numeral 30 generally indicates the rejector which comprises a solenoid operated air valve 112, an air inlet pipe 113, and an exhaust tube 114 which surrounds the inlet pipe. The valve 112 is a solenoid operated control valve that controls the initiation of high pressure air to the seed remover. The high pressure air originates from a compressor (not shown) located exteriorly of the tablet machine. The air inlet 113 ducts the high pressure air from the air valve to a point directly over the die table 14 under which all of the dies 15 pass. The axes of all the dies in the die table lie in a circle, and the discharge end 113a (FIG. 7) of the air pipe 113 is also located on that circle. The exhaust tube at its inlet and surrounding the discharge end 113a of the air pipe is substantially larger than the diameter of the dies and is very closely spaced from the dies so that, when high pressure air is directed into a mold cavity, the contents therein will be forced upwardly by the air stream into the exhaust tube. The outlet end of the exhaust tube 114 terminates in a waste pile (not shown) the contents of which are ultimately discarded. The entire rejector 30 is rigidly attached by a support 115 to the base table 48 of the lower housing 46 of the tablet machine at a position between the feeding baffle 28 (FIG. 1) and the tablet forming area 32.

The operation of the solenoid valve 112 is precisely timed by the Electrical Seed Detector and Logic Circuit, hereinafter described, so that the high pressure air is ducted by the air inlet pipe 113 into a selected mold cavity as that cavity passes thereunder. The high pressure air blows the entire contents of the die upward and out through the exhaust tube 114 to the waste pile. The clearance between the inlet port of the exhaust tube and the rotating die table 14 is sufficiently small so as to prevent the seeds and frangible materials from escaping.

It should be appreciated that the rejector is located at a position on the tablet machine so that the machine will never form either a blank tablet or a capsule containing more than the requisite number of seeds. The rejector is placed between the feeding baffle 28, where the second charge of frangible material is placed in the mold cavities, and the tablet forming area 32 where the upper and lower punches 70 and 68, respectively, compress the contents of the mold cavities. The rejector empties the mold cavities before the tablets are compressively formed. Thus, there is no possible way to mix properly made tablets with improperly made tablets since the improper combinations of materials are never compressed into tablet form.

THE MECHANICAL OPERATION OF THE ENTIRE MACHINE

Referring to FIGS. 1 and 8–16, inclusive, the overall mechanical operation of the one-piece tablet machine will now be described. In the preferred embodiment of the invention, it is desired that only one seed be placed in each tablet, and the following description will, therefore, be limited to the production of one-seed tablets. The die table 14 rotates counter-clockwise (FIG. 2) and transports the mold cavity in each die through a series of stations where processing steps are performed to form a one-seed tablet. For illustrative purposes one mold cavity will be followed in its path around the machine. It should be understood, however, that each processing step is performed on every mold cavity as all of the dies move in their circular path around the machine.

The tablet forming process begins at the upper rearward corner of the feeding baffle 18 as shown in FIG. 1. The lower punch 68 is elevated to its highest position, as shown in FIG. 8, and fully fills the die 15 in the die table 14. This position of the punch can be called the preparation position. The top surface of the lower punch is flush with the flat upper surface of the die table. As the die table rotates and the die passes under the first feeding baffle 18, the lower punch 68 descends to create the mold cavity in the die. This position of the punch can be called the first fill position and is shown in FIG. 9. The die is passing under the feeding baffle 18 and is being filled with the first charge of frangible material. This frangible material preferably comprises a seed bed material, such as vermiculite, plus a suitable binder and the requisite amount of moisture so that compression of the material will result in a solid tablet which can be handled for planting purposes without disintegrating but which will soften under the application of water in the field in order to allow the seed therein to germinate and the resulting plant to grow. The tablet material is stored in the powder horn 16 and is dispensed by gravity into the feeding baffle 18. Reference numeral 18a (FIG. 9) indicates a sidewall of the feeding baffle 18 that extends to the surface of the die table and retains the frangible material within the feeding baffle preventing it from being transported around the table unless it is carried in a die.

As the die passes out from under the feeding baffle 18, the lower punch 68 is elevated slightly into a position as shown in FIG. 10. The material in the die is pushed up to form a small mound which is struck off by a scraper blade 116 (FIG. 1) which has an edge positioned directly adjacent to the surface of the die table. The lower punch is elevated slightly after filling in order to eliminate any voids in the frangible material around the top of the die due to bridging or other improper filling. In other words, the mold cavity is purposely over filled, and then the excess material is removed.

In traveling between the scraper blade 116 and the seed slot 93 in the stationary support plate 80, the lower punch 68 descends slightly (to the position shown in FIG. 11) in order to create a pocket in the mold cavity to receive the seed.

Simultaneously with the aforementioned steps, the seed transfer plate 22 rotates in synchronization with the die table 14 because the entire seed feeding apparatus 19 is driven by the exposed medial portions of the lower punches 68. As each seed cup 21 on the transfer table passes beneath the seed singulator 20, an individual seed is deposited therein. The seed cups slide along horizontally on top of the stationary support plate 80 that forms a floor for the seed cups.

At the seed drop position, FIG. 11, the seed cup 21 containing a seed passes over the seed slot 93. The seed slot is provided in the stationary support plate 80 at the precise spot where all the seed cups pass directly over the dies 15 in the die table. The seed drops down through the seed slot and onto the first charge of frangible material in the die cavity. The precise synchronization between the seed transfer plate 22 and the die table 14 is adjusted by varying the angular position of the transfer plate relative to the die table by using a phase adjusting hub (not shown) on the seed transfer shaft 82. This adjustment is necessary to compensate for the varying forward momentum of the different types of seeds as they are deposited into the mold cavities so that each particular type of seed can be positioned as close as possible to the middle of the mold cavity.

As the seed falls through the seed slot 93, the projected area is measured by the light received in the fiber light guides 101. The seed interrupts the beam of light across the slot and the amount and duration of the interruption is converted into a continuous electrical signal. The electrical signal is processed by the Electrical Seed Detector and Logic Circuit to determine if a seed actually dropped into the mold cavity. The electrical signal is also processed in the same circuit to determine if two or more seeds dropped together. The information with regard to the number of seeds deposited in the mold cavity is stored, by means to be disclosed hereinafter, until the mold cavity passes under the rejector 30 where it is used to reject those tablets which contain an improper number of seeds.

Returning to the movement of the mold cavity, as the die table 14 rotates the mold cavity out from beneath the seed slot 93 and toward the baffle 28 which will feed the second charge of material, the lower punch 68 descends within the die 15 in preparation for the second fill to a position as shown in FIG. 12. When the die passes under the feeding baffle 28, the mold cavity created by the recent descent of the lower punch is filled (FIG. 12) with the second charge of frangible material. The second charge of frangible material is stored in the powder horn 26 (FIGS. 1 and 3) and is dispensed by gravity into the feeding baffle 28. As the mold cavity passes out from beneath the feeding baffle 28, the lower punch 68 is elevated slightly into a position as shown in FIG. 13. The frangible material in the die is pushed up to form a mound and the mound is struck off by a scraper blade 118 positioned directly adjacent to the surface of the die table.

The mold cavity next passes beneath the rejector 30. At this time the stored information with regard to the number of seeds deposited in the mold cavity is acted upon. If the information indicates that only one seed fell through the seed slot as desired, then the rejector is not actuated and the mold cavity is not emptied. On the other hand, if the information indicates that a seed did not fall through the seed slot 93 or that two or more seeds fell, then the mold cavity is emptied by means of a blast from the rejector 30 as shown in FIG. 14. The solenoid operated valve 112 (FIG. 7) of the rejector is opened by the Electrical Seed Detector and Logic Circuit and high pressure air is admitted into the inlet pipe 113. This high pressure air blows the contents of the mold cavity out of the die and up into the exhaust tube 114. The exhaust tube leads to a waste pile (not shown).

After passing under the rejector 30, the die 15 is moved through the tablet forming area 32 (FIG. 1) of the tablet machine. In the table forming area the lower punch 68 is elevated and, simultaneously, the upper punch 70 is depressed as shown in FIG. 15. The relative vertical motion of the punches 68, 70 is controlled by the upper and lower cam tracks 74 and 72 (FIG. 3). During all of the hereinbefore described steps the upper punch 70 has remained elevated and out of the way. The upper punch 70 is lowered only at the tablet forming area to bring the two punches together in order to compress the frangible material around the seed to form a rigid, easily handled seed tablet. If the die 15 was previously emptied by the rejector 30, then the punches come together in an empty mold cavity and no tablet is formed.

In a preferred embodiment of the one piece tablet machine of the present invention, the compression ratio for best results was determined to lie within the limits of 5:1 and 3:1 when using vermiculite as the tablet forming material. The compression ratio is defined as the ratio of the volume of the filled mold cavity before compression to the volume of the mold cavity after compression with the punches at their closest point of travel. If the compression ratio is increased about 5:1, the seeds are damaged by the pressure of the punches and will not consistently germinate. If the compression ratio is decreased below 3:1, the tablets are too fragile to be mechanically handled without breaking apart.

After leaving the tablet forming area 32, the die 15 next travels around the machine to an exit chute 120 (FIG. 2). During this motion the upper punch 70 is retracted, and the lower punch 68 moves upwardly to the top of the die and comes to the position flush with the upper surface of the die table 14 as shown in FIG. 16. The newly formed tablet is then pushed into the exit chute 120 by a scraper blade 122 attached to the leading edge of the first feeding baffle 18. The newly formed tablet slides down the exit chute and is removed from the machine. At this time the die 15 and the associated punches 68, 70 have completed a full operating cycle and have returned to the preparation position (FIG. 8) in order to repeat the process hereinbefore described.

THE ELECTRICAL SEED DETECTOR AND LOGIC CIRCUIT

The electrical seed detector and logic circuit (FIG. 17) processes the voltage output from the photocell 102 in the optical seed detector 24 (FIG. 5). The circuit determines, first, if any seeds fell through the seed slot 93 from a seed cup 21, and secondly, if more than the requisite number of seeds fell at one time through the seed slot. If no seeds fell into the mold cavity or if more than one seed fell, then the circuit commands the rejector 30 (FIG. 7) to empty the mold cavity when the mold cavity is subsequently moved to the rejector. If, as desired, precisely one seed fell into the mold cavity, then the rejector does not disturb the mold cavity and the contents of the mold cavity are subsequently compressed into a tablet.

Referring to FIG. 5, the light source 99 in the optical seed detector 24 generates the illumination received by the photocell 102. The end 104 of the first array of fiber optic light guides 100 transmits a rectangular beam of light (FIGS. 4 and 6) across the seed slot 93. The beam of light is received by the end 106 of the second array of fiber optic light guides 101 and is transmitted to the photocell 102. The output of the photocell is a voltage proportional to the illumination received from the light source. As the seeds drop through the seed slot 93, the illumination across the seed slot is partially and momentarily interrupted. When a seed falls through the light beam, the voltage output from the photocell drops proportionally to the amount of illumination obscured by the seed. The voltage output then is a signal proportional to the projected area of the seed passing through the rectangular beam of light.

Referring now to FIG. 17, the voltage signal from the photocell 102 is substantially increased by an amplifier 160. The output of the amplifier is a magnified analog signal proportional at any given time to the instantaneous projected area of the seed passing through the light beam. The analog signal goes to a threshold detector 162 that is set to discriminate between the actual passage of a seed and the normal variations in the ambient light conditions particularly the variations due to the reflections of light from the area around the seed cups. If the decrease in the level of the signal to the threshold detector is greater than a fixed amount to thereby indicate the passage of a seed, the threshold detector generates a pulse that is directed to a set/reset flip-flop 164. Reference letter S indicates that the output from the threshold detector sets the flip-flop. This flip-flop stores the pulse until it can be clocked into a conventional serial shift register 166. The shift register acts as a memory to provide for the storage of seed information during the interval between the time a die 15 passes under the seed slot 93 and the time that the same die passes under the rejector 30. The shift register is sequenced as hereinafter described by the optical shaft encoder 90 that is mounted on the seed transfer shaft 82 (FIG. 1). In the embodiment of the tablet machine described the serial shift register is a 12 bit register with each bit corresponding to one of the 12 die positions between the seed slot and the rejector.

The signal output of the shift register 166, indicating the presence or absence of a seed, is one input to a conventional AND gate 168. In the circuitry shown it will be assumed that a negative pulse is provided from the flip-flop 164 when it is set so that a positive output from register 166 indicates that no seed was present and a negative output indicates that a seed was present. The other input to the AND gate 168 is a timing pulse as hereinafter described. If both inputs to the AND gate 168 are positive, the AND gate is actuated and the output therefrom goes to a one-shot multivibrator 170. The output of the one-shot 170 is directed to a power amplifier 172 that is, in turn, connected to the actuating solenoid of the air valve 112 of the rejector 30 (FIG. 7). The air valve fires precisely as the designated die passes underneath the air blast pipe 113. The one-shot 170 provides a pulse which determines the duration of the actuation of the solenoid operated air valve 112.

The clocking or sequencing of the shift register 166 is controlled by the output of the optical shaft encoder 90 that is attached to the lower end of the seed transfer shaft 82 (FIG. 1) as hereinbefore described. The optical shaft encoder is of conventional construction. As the seed transfer shaft 82 rotates, the optical shaft encoder generates a series of uniformly spaced pulses. In the embodiment of the invention described, the shaft encoder generates 31 pulses for each revolution of the seed transfer shaft. Since the described embodiment contains 31 seed cups and 31 dies, the shaft encoder generates one pulse for each seed cup as it passes a particular point on the tablet machine. In addition, the shaft encoder also generates a second series of pulses at the rate of 16 pulses for every pulse in the 31 pulse series, i.e., at the rate of 496 pulses per revolution of the seed transfer shaft. In FIG. 17 the low pulse rate is indicated by reference letter A and the higher multiple pulse rate is indicated by reference letter B.

Pulses at pulse rate A are amplified by amplifier 174 and are shaped by a one-shot multivibrator 176. The pulse from one-shot 176 is used as a clock pulse for the rest of the circuit. The clock pulse is synchronized with the movement of the die table 14 so that the passage of each mold cavity beneath the seed slot advances the information in the serial shift register 166 by one bit. The clock pulse is also used to reset flip-flops 208 and 222 and counter 220, the functions of which will be explained presently. The trailing edge of the clock pulse from the one-shot 176 is also used to trigger a second one-shot multivibrator 178 which is connected in series therewith. The output pulse of the one-shot 178 goes to an OR gate 180 which is used to reset the flip-flop circuit 164 as indicated by reference letter R.

The electrical circuit looks for a seed to drop only during a prescribed interval of time associated with each seed cup 21. At the end of the time interval the circuit is reset to begin another looking period for the next seed cup. The reset signal is provided by an A pulse from the optical shaft encoder and is designed to be sent when the seed slot 93 is located approximately midway between a pair of adjacent seed cups, i.e., at a time when there is no possibility of a seed being dropped into a mold cavity. If a sufficient seed signal is detected by the threshold detector 162 during an interval between a pair of A pulses, the flip-flop 164 enters a seed-present signal (i.e., a "zero") into the shift register 166 for that interval. The shift register stores this signal until that mold cavity into which the seed fell passes under the rejector 30. During this time, the signal is serially shifted through the shift register by the A pulses. At the end of the prescribed number of intervals, the shift register transfers its output to the AND gate 168, but the seed-present signal cannot actuate the AND gate and the mold cavity associated therewith passes under the rejector without being disturbed.

On the other hand, if no seeds are detected by the threshold detector 162, the flip-flop 164 enters a no-seed signal (i.e., a "+" or positive voltage) into the shift register 166 at the end of the looking interval when the register is clocked. The shift register again stores the signal for a prescribed number of intervals and then transfers the signal to the AND gate 168. A no-seed signal actuates the AND gate if the timing pulse is present. As pointed out previously, any actuation of AND gate 168 causes the solenoid operated air valve 112 to be actuated to empty the mold cavity passing the rejector 30.

To precisely time the initiation of the solenoid operated valve 112 of the rejector 30, an easily adjustable timing circuit is used. The B pulses from the optical shaft encoder 90 are directed to a binary counter 182 that counts up to 16. The number 16 corresponds to the ratio of pulses between the A and B pulse rates or the number of B pulses generated for each A pulse generated. As each B pulse is received, the output of the binary counter 182 increases by equal increments up to 16 and then it resets. The output of the binary counter is connected to a digital-to-analog converter 184 that transforms the output of the binary counter into an analog signal which provides one of the inputs for an adjustable comparator 186. The other, fixed input to the comparator can be adjusted so that an output pulse will be produced, to trigger AND gate 168, at any prescribed analog signal level. Thus, the occurrence of the output pulse from the comparator 186 can be precisely timed to occur at any time within the time interval between the A pulses. In other words, the occurrence of an output pulse from the comparator 186 can be timed so that the solenoid operated valve 112 will be actuated at the precise time necessary to evacuate the contents of the mold cavity which has no seed therein.

The electrical seed detector and logic circuit can also determine if more than one seed fell through the seed slot 93 from a single seed cup 21. The signal from the photocell 102, after amplification by the amplifier 106, is further amplified by an amplifier 200. The output of the amplifier 200 is, therefore, an analog signal which is inversely proportional to the instantaneous projected area of the seeds falling through the rectangular light beam of the seed detector. This signal from the amplifier 200 is directed to an analog integrator circuit 204. The integrator 204 also has a reset input from a comparator 203 and the digital-to-analog converter 184. The integrator circuit 204 integrates the signal from the photocell 102 with respect to time and has an output proportional to the total projected area of the seed or seeds that have passed through the seed slot 93 during any one looking interval.

The output of the integrator 204 is connected to a comparator 206 that compares the output with a preset signal which is set at a level determined to be between the signal representing the projected area of one seed and the signal representing the projected area of two seeds. The comparator 206 is connected to a flip-flop 208 that is, in turn, connected to one of the inputs of an OR gate 210. The OR gate 210 is connected to another OR gate 180 that provides a reset signal to the flip-flop 164 as indicated by reference letter R.

If the output of the comparator 206 indicates that two or more seeds have fallen through the seed slot 93 during the same looking interval, then the OR gates 210 and 180 reset the flip-flop 164 and, in effect, null the seed-present signal from the threshold detector 162. Since the threshold detector 162 provides the same seed-present signal to the flip-flop 164 no matter how many seeds pass through the seed slot 93 at one time, the OR gate 180 cancels this signal if more than one seed passed through the slot. The integrator 204 and comparator 206, therefore, reset the flip-flop 164 so that a signal will be entered into the shift register 166, at the end of the looking interval, that is the same signal as that provided when the optical seed detector does not see a seed at all.

A further subcircuit can be used to insure the actuation of the rejector 30 where two (or more) seeds fall from the same seed cup and each seed generates a more or less separate pulse out of the amplifier 160. This subcircuit is useful because the integrator 204 is subject to error where two seeds might be oriented in a manner such that their total projected area would not be sufficient to cause a signal from the comparator 206. That is to say, it is possible to count two seeds as one seed under certain circumstances and which certain types of seeds. The further subcircuit therefore includes a binary counter 220 that receives the output signals from the threshold detector 162 and counts up to two. If two, independent and distinct signals or peaks, are received from the threshold detector 162, it will be established that there are at least two seeds present and the binary counter will set a flip-flop 222 as indicated by reference letter S. If less than two pulses are received, the flip-flop 222 is not set. The output of the flip-flop 222 is connected to the OR gate 210 which, as previously explained, resets the flip-flop 164. In effect, the binary counter 220, once two signals have been counted, sends a continuous reset signal to the flip-flop 164 to insure that a no-seed signal (i.e., a "+" or positive signal) is entered into the shift register 166 the next time that the register is clocked and the operation of the circuitry is, therefore, not made to depend on operation of the integrator 204. The counter 220 thereby serves as a back-up for the integrator 204 and reduces the chances of forming an improper tablet with the machine of the present invention.

It has been determined that the continuous integration of the signal which represents the instantaneous projected areas of the seeds falling together in groups is the best way to determine if more than the requisite number of seeds fell through the seed slot during one looking interval. The measurement of either the pulse height or the pulse duration of the output signal from the amplifier 160 was not found to be sufficiently accurate because the seeds can fall both separately from each other or together. This might be seen from FIG. 18 which illustrates three different types of signals observable from the output of the amplifier 160 each indicating the passage of more than one seed through the seed slot. Moreover, if the optical seed detector is used to determine numbers of seeds in higher quantities than two, as hereinafter described, then integration of the signal is necessary in order to insure that the correct number of seeds is placed in each tablet.

MULTIPLE SEED OPERATION

The tablet machine of the present invention is also capable of encapsulating precisely numbered, multiple seed combinations. For example, the machine can be adjusted to form tablets containing precisely two seeds and to reject all tablets (prior to their formation) that do not contain a seed or that contain one or three or more seeds. Likewise, the machine can be adjusted to form tablets containing precisely three seeds.

Referring to FIG. 1, the adjustment for multiple seed operation requires a small modification of the seed singulator 20. For two seed tablet operation, the drum 95 is exchanged for a similar drum having two parallel circles of conical cavities 96 on the smooth peripheral surface thereof. Likewise, for three seed tablet operation, the drum 95 is exchanged for a similar drum having three parallel circles of conical cavities 96. The conical cavities comprising each circle are arranged in parallel azimuthal arrays so that when the seed cups 21 pass beneath the drum, one seed falls from each laterally aligned cavity into the seed cup. Since the seed singulator thereby deposits the desired number of seeds into each seed cup, no adjustment of the synchronization or the timing of the seed transfer shaft 82 is needed. Moreover, the operations of the punches 68 and 70, the die table 14, and the rejector 30 remain the same.

The other adjustment for multiple seed operation is made in the Electrical Seed Detector and Logic Circuit. Because the electrical seed detector processes signals originating from an instantaneous measurement of projected seed area, the circuit can be adjusted for multiple seed operation by varying the threshold signal level at which the circuit will respond. The threshold detector 162 may be replaced by an integrator similar to the integrator 205, so that an output signal to flip-flop 164 is provided only if two (or some other preselected number) or more seeds fell during one looking interval. In addition, the activating signal level of the comparator 206 (FIG. 17) measuring the output of the integrator 204 must be raised in order to reject those seed combinations in excess of the preselected number, i.e., the integrator 204 is set to discriminate between 2 and 3 seeds or between 3 and 4 seeds, etc. Finally, the counter 220 is reset to count to a number which is one unit higher than the requisite number of seeds desired for each tablet. For example, if it is desired to place two seeds in each tablet, then the counter 220 is set to count to three before reseting the flip-flop 164 to cause the later activation of the rejector 30.

Although the best mode contemplated for carrying out the present invention has been herein shown and described, it will be apparent that modification and variation may be made without departing from what is regarded to be the subject matter of the invention.

What is claimed is:

1. Apparatus for encapsulating agricultural seeds in frangible materials, comprising:
a tablet forming press having means for depositing frangible materials into a die and means for compressing said materials together in the die to form a tablet;
means for depositing a predetermined number of seeds in said materials in the die of the press whereby said compressing means forms a tablet containing said predetermined number of seeds;
means for scanning the seeds deposited in said die by said depositing means and for generating an electrical signal when no seeds are deposited and when the number of seeds deposited is greater than said predetermined number; and
means for rejecting any tablet lacking said predetermined number of seeds as indicated by said electrical signal from the scanning means.

2. Apparatus of claim 1 wherein said depositing means includes means for singulating seeds from a bulk supply and depositing a single seed into said die of the tablet press.

3. Apparatus of claim 1 wherein said tablet forming press includes a plurality of dies in which separate tablets are formed, and means for sequentially conveying each of said dies to said depositing means, said scanning means and said rejecting means.

4. Apparatus of claim 1 wherein said means for scanning the seeds includes:
means for illuminating with a beam of light a portion of the path through which the seeds travel from said seed depositing means to said die;
means for measuring the amount of light obscured by the passage of seeds along said path; and
means for converting the measured amount of obscured light to an electrical signal proportional to the number of seeds passing along said path.

5. Apparatus of claim 4 wherein said scanning means is arranged to generate an electrical signal indicating that exactly one seed was deposited in the materials by the seed depositing means.

6. Apparatus of claim 1 wherein the seed depositing means includes:
a seed singulator for separating individual seeds from a mass of seeds, said singulator being positioned remote from said die;
a plurality of open mouth seed cups having openable bottoms; and
means for sequentially conveying said cups between said seed singulator and the die, said seed cups being oriented so as to receive seeds from the seed singulator through their open mouths and so as to deposit the seeds into the die through their openable bottoms.

7. Apparatus for encapsulating agricultural seeds in frangible materials, comprising:
a conveyor for transporting a plurality of spaced dies past a plurality of stations, each of said dies providing a mold for forming a tablet;
a first frangible material dispenser for dispensing at a tablet bottom forming station a first measured charge of frangible material into each die on said conveyor;
means for depositing a seed at a seed inserting station into the dies transported by the conveyor, said seed inserting station being located downstream of said tablet bottom forming station so that said seed is deposited on top of the first measured charges of frangible material;
means for scanning the seeds deposited on top of the first measured charges in the dies;
means for processing the information from said scanning means and for generating a control signal when more than one seed has been deposited into a die and when no seeds have been deposited into said die;
a second frangible material dispenser for dispensing at a tablet top forming station a second measured charge of frangible material on top of the first measured charge of frangible material in each die;
means for removing at a rejecting station the charges of materials and seeds from those dies containing more or less than one seed, said removing means being arranged to receive said control signal from said information processing means; and
means for compressing at a tablet forming station the two measured charges of frangible materials about a seed in each die.

8. Apparatus of claim 7 wherein the seed depositing means includes:
a seed singulator for separating individual seeds from a mass of seeds at a position remote from the conveyor transporting the dies;
a plurality of transportable seed cups each having an open mouth and an open bottom;
a stationary plate for supporting the seed cups, said plate being disposed between the seed singulator and the die conveyor and having a seed slot provided therein overlying the path of the dies; and
means for transporting the seed cups along the stationary support plate between the seed singulator and the dies whereby the seed singulator is arranged to deposit a seed into the open mouth of each of the seed cups and the seeds thus deposited are retained in said cups by the underlying stationary support plate until each seed cup comes into communication with an associated die through said seed slot whereby the seed falls through the open bottom of the seed cup through the seed slot and into said associated die.

9. Apparatus according to claim 7 wherein said means for processing the information from said scanning means includes an integrating circuit.

10. Apparatus for encapsulating agricultural seeds in frangible materials comprising:
a rotating die table having a plurality of spaced tablet forming cavities contained therein;
means for rotating the die table;
a pair of compressing punches slidably received in each cavity on the die table, and means for individually reciprocating said punches within said cavities during rotation of the die table;
a first frangible material dispenser for storing and dispensing a measured quantity of frangible material into each cavity as said cavities are moved thereunder;
a seed singulator for separating individual seeds from a mass of seeds,
means for transferring seeds from the seed singulator to said cavities in the rotating die table, said seed transferring means being located downstream from said first material dispenser whereby each seed is deposited onto the first charge of frangible material in a cavity;
means for measuring the projected areas of the individual seeds during transfer between the seed singulator and the cavities;
means connected to said measuring means for determining the number of seeds deposited in each cavity;
a second frangible material dispenser located downstream of said seed transferring means for storing and dispensing measured quantities of frangible material into each cavity as said cavities are passed thereunder;
a rejector connected to said seed number determining means for removing any frangible materials and any seeds from a cavity prior to the compression thereof if an improper number of seeds is deposited in a cavity; and
means for encapsulating the seeds between the first and second charges of frangible materials in each cavity by reciprocally moving the compression punches together within the cavities, whereby a one-piece tablet containing an agricultural seed is compressibly formed.

11. Apparatus of claim 10 wherein said preselected quantity of seeds deposited into each cavity comprises one seed.

12. Apparatus of claim 10 wherein said preselected quantity of seeds deposited into each cavity comprises two or more seeds 13. Apparatus of claim 10 wherein said means for encapsulating the seeds by reciprocally moving the compression punches together operates so that a tablet is formed with a compression ratio of from between about 3:1 and about 5:1.

14. Apparatus of claim 10 wherein the means for transferring seeds comprises:
a seed transfer plate having a circular array of bores therethrough;
means for rotating the seed transfer plate in synchronization with the rotating die table;
a plurality of seed cups, each seed cup being received in a bore in the seed transfer plate and each seed cup having an upward opening mouth for receiving a seed from the seed singulator and a downward opening exit for depositing the seed onto the first charge of frangible materials in each cavity; and
a stationary support plate rigidly mounted to the seed encapsulating apparatus and supporting the seed transfer plate and the seed cups, said seed transfer plate being positioned so as to overlie the stationary support plate thereby permitting the seed cups to slide along on top of the stationary support plate, said stationary support plate having a seed slot in the path of the seed cups and the cavities; whereby the seed cups are slidably pushed along on top of the stationary support plate by the seed transfer plate and any seeds within the seed cups fall through the downward opening exit, through the seed slot in the stationary support plate, and into the frangible materials in the cavities in the die table.

15. Apparatus of claim 10 wherein the means for measuring the projected areas of the seeds comprises:

a lamp;
a first array of light guides for transmitting illumination from the lamp across the path of the seeds being transferred by the seed transferring means, whereby the seeds obscure a portion of the illumination according to the projected area of each seed;
a second array of light guides for receiving the illumination from the first array of light guides;
a photocell for receiving the illumination from the second array of light guides; and means for electrically measuring the output of said photocell.

16. Apparatus of claim 15 wherein the means for electrically measuring the output of said photocell includes an integrator for integrating the instantaneous projected areas of the seeds with respect to time.

17. Apparatus of claim 15 further including a memory for storing the information from said measuring means for subsequent use by said rejector.

18. Apparatus of claim 17 wherein said memory comprises a shift register.

19. In an apparatus for encapsulating agricultural seeds in frangible materials, which apparatus includes: a table forming press having at least one compression punch and at least one compression mold whereby the compression punch compresses the frangible materials in the mold to form a tablet; a seed singulator for separating individual seeds from a mass of seeds; means for depositing the seeds from the seed singulator in the compression mold whereby said tablet forming press forms tablets containing the seeds; means for monitoring the deposit of seeds into the compression mold; and means for rejecting any capsules formed in the tablet press that contains no seeds, the improvement comprising:

means for measuring the instantaneous projected area of a seed being deposited into the compression mold by the seed depositing means;
means for integrating the output of said last named means and for generating an electrical signal representative of the number of seeds deposited in a compression mold by the seed depositing means; and
means associated with said integrating means for commanding the rejecting means to eliminate any tablets prior to formation in the press that will have more than a predetermined number of seeds contained therein.

20. Apparatus for use in a seed tablet making machine for determining the number of agricultural seeds falling together in groups, said apparatus comprising:

means for generating a beam of light which is wide in the horizontal plane and narrow in the vertical plane through which the seeds travel during free fall whereby the seeds obscure a portion of the beam according to the projected area of each seed;

a photodetector for receiving the beam of light from the generating means and for measuring the amount of illumination received thereby; and
means for integrating the output of the photodetector and generating an electrical signal representative of the number of seeds falling together in a group.

21. Apparatus of claim 20 wherein said light beam generating means comprises a lamp, a transmitting array of fiber optic light guides for collimating the illumination from the lamp into said beam, and a receiving array of fiber optic light guides for receiving the illumination from the transmitting array of light guides and for transmitting the received illumination to said photodetector.

* * * * *

UNITED STATES PATENT OFFICE
CERTIFICATE OF CORRECTION

PATENT NO. : 3,836,299
DATED : September 17, 1974
INVENTOR(S) : ROBERT K. HOUSTON ET AL It is certified that error appears in the above-identified patent and that said Letters Patent are hereby corrected as shown below:

| | | |
|---|---|---|
| Column 1, | line 49: | change "coverings" to --coatings--; |
| | line 59: | change "tained" to --taining--. |
| Column 2, | line 56: | change "corss" to --cross--. |
| Column 4, | line 14: | change "power" to --powder--; |
| | line 16: | change "change" to --charge--; |
| | line 64: | change "tablet" to --table--. |
| Column 5, | line 20: | change "the" (second occurrence) to --The--; |
| | line 59: | after "72" insert --includes--. |
| Column 8, | line 13: | after "angle" insert --gear--. |
| Column 9, | line 2: | after "retaining" delete "guides" and insert --plate--; |
| | line 37: | change "second" to --seed--; |
| | line 37: | change "into" to --onto--; |
| | line 41: | change "received" to --receiving--; |
| | line 56: | change "in" to --into--; |
| | line 56: | change "measure" to --measures--. |
| Column 12, | line 57: | change "table" to --tablet--. |
| Column 13, | line 12: | change "about" to --above--. |
| Column 16, | line 55: | change "which" to --with--. |
| Column 17, | line 64: | change "205" to --204--. |
| Column 21, | line 36: | change "table" to --tablet--. |

Signed and Sealed this ninth Day of September 1975

[SEAL]

Attest:

RUTH C. MASON
Attesting Officer

C. MARSHALL DANN
Commissioner of Patents and Trademarks